(12) United States Patent
Janko

(10) Patent No.: US 9,926,708 B1
(45) Date of Patent: Mar. 27, 2018

(54) MAGNETIC FASTENERS AND WALL COVER SYSTEM

(71) Applicant: Mikulas Janko, Sarasota, FL (US)

(72) Inventor: Mikulas Janko, Sarasota, FL (US)

( * ) Notice: Subject to any disclaimer, the term of this patent is extended or adjusted under 35 U.S.C. 154(b) by 0 days.

(21) Appl. No.: 15/812,230

(22) Filed: Nov. 14, 2017

Related U.S. Application Data

(63) Continuation-in-part of application No. 15/200,573, filed on Jul. 1, 2016.

(60) Provisional application No. 62/344,115, filed on Jun. 1, 2016.

(51) Int. Cl.
  *E04F 13/08* (2006.01)
  *E04G 23/02* (2006.01)

(52) U.S. Cl.
  CPC ...... *E04F 13/0883* (2013.01); *E04F 13/0801* (2013.01); *E04G 23/0214* (2013.01)

(58) Field of Classification Search
  CPC .... E04G 23/02; E04F 13/0883; E04F 13/077; E04F 13/072; E04F 13/00823; A47G 1/17; A47G 2001/0672; A47G 1/1653
  USPC ............. 52/DIG. 4; 248/683, 467, 309.4
  See application file for complete search history.

(56) References Cited

U.S. PATENT DOCUMENTS

| | | | | |
|---|---|---|---|---|
| 2,742,250 | A | 4/1956 | Cronberger | |
| 3,239,178 | A * | 3/1966 | Pompa | F16B 47/003 211/1 |
| 4,211,382 | A * | 7/1980 | Bonfils | A47G 1/168 248/467 |
| 4,709,522 | A * | 12/1987 | Carnahan | E04F 19/0436 52/288.1 |
| 4,835,923 | A * | 6/1989 | Ybarra | E04B 2/7409 52/238.1 |
| 4,875,654 | A * | 10/1989 | Chandonnet | A47G 1/17 248/206.5 |
| 4,934,119 | A * | 6/1990 | Ybarra | E04B 2/7409 52/238.1 |
| 4,976,055 | A * | 12/1990 | Kane | G09F 1/12 248/206.5 |
| 5,269,083 | A * | 12/1993 | Vampatella | A47G 1/065 248/206.5 |
| 6,305,656 | B1 * | 10/2001 | Wemyss | A47G 23/0216 206/5 |
| 6,405,983 | B1 * | 6/2002 | Goj | A47G 1/17 248/205.1 |
| 6,425,560 | B1 * | 7/2002 | Dembowiak | A47G 1/17 248/205.2 |
| 6,484,996 | B2 * | 11/2002 | Astell | A47G 1/1613 248/455 |
| 6,735,896 | B1 * | 5/2004 | Zager | A47G 1/17 40/611.02 |

(Continued)

*Primary Examiner* — Brent W Herring
(74) *Attorney, Agent, or Firm* — Jason Daniel, Esq.; Daniel Law Offices, P.A.

(57) ABSTRACT

A magnetic fastener and wall covering system include at least one wall panel having a front facing surface, a magnetically attractive rear facing surface and a side surface forming any number of different shapes. A plurality of wall fasteners and wall anchors are provided to penetrate and engage a wall. A plurality of magnetic spacers are provided having a central aperture for receiving one of the plurality of wall fasteners, and for attracting to the magnetically attractive rear surface of the wall panel. The system also includes one or more wall strips having a magnetic top surface and an adhesive back surface.

10 Claims, 12 Drawing Sheets

(56) References Cited

U.S. PATENT DOCUMENTS

| | | | |
|---|---|---|---|
| 8,042,308 B2* | 10/2011 | Sullivan | G09F 19/22 434/408 |
| 8,287,034 B2* | 10/2012 | Smith | B60R 13/0206 24/303 |
| 8,397,411 B2 | 3/2013 | Russo et al. | |
| 8,490,936 B2* | 7/2013 | Rinck | F21S 4/10 248/206.5 |
| 9,328,754 B2* | 5/2016 | Stokes | F16B 5/0692 |
| 2005/0045784 A1 | 3/2005 | Pitlor | |
| 2008/0296450 A1* | 12/2008 | Lang | A47F 7/22 248/206.5 |
| 2010/0003102 A1 | 1/2010 | Nagaiwa et al. | |
| 2011/0290965 A1* | 12/2011 | Virgin | G06F 1/1632 248/205.3 |
| 2012/0280098 A1 | 11/2012 | Rinck | |
| 2013/0291366 A1* | 11/2013 | Hoffman | F16B 35/04 29/525.02 |
| 2014/0061409 A1* | 3/2014 | Mayhew, Jr. | F16M 13/02 248/206.5 |
| 2014/0096467 A1* | 4/2014 | Norton | E04F 13/0833 52/582.2 |
| 2014/0263895 A1* | 9/2014 | Dickenson | B60R 13/0206 248/206.5 |
| 2015/0047797 A1* | 2/2015 | Weyer | B60J 1/2094 160/370.21 |
| 2015/0292213 A1 | 10/2015 | Oliver | |

\* cited by examiner

MAGNETIC FASTENERS AND WALL COVER SYSTEM

CROSS-REFERENCE TO RELATED APPLICATIONS

This application claims the benefit of U.S. Application Ser. No. 62/344,115 filed on 1 Jun. 2016, and U.S. application Ser. No. 15/200,573 filed on 1 Jul. 2016, the contents of each of which are incorporated herein by reference.

TECHNICAL FIELD

The present invention relates generally to wall fasteners, wall plates and wall covers, and more particularly to magnetic fasteners and wall cover system.

BACKGROUND

The statements in this section merely provide background information related to the present disclosure and may not constitute prior art.

At some point and time, virtually every residential and/or commercial building will encounter an issue that requires a user to repair drywall. In many instances, the need will arise from unintentional damage caused to a wall or other surface. In many other instances, users need to remove a portion of the sheetrock in order to access one or more components located within the walls of the building. Whether it is an electrical junction box, a plumbing line or an HVAC component, the fact remains that the drywall must be removed before the same can be accessed.

Although the process of cutting and removing the drywall is relatively simple and does not require specialized tools or knowledge, the same is not true for repairing the wall upon completion of the task. As such, the sheetrock repair industry has been unable to provide a reliable wall repair system and method that are simple, fast, and strong. Traditional wall repair systems, for example, include a myriad of supplies and equipment that must be used to repair even small wall holes. Specifically, a typical drywall repair kit includes a curable, setting-type repair compound (or "mud"), drywall tape, sandpaper, a compound spreader, a cutting tool, a mixing tray, a mixing stick, sheetrock replacement panels, and more. Nearly all of these tools and supplies are required to complete even a relatively minor drywall repair job.

Moreover, the traditional wall repair methods that use these systems are difficult and time-consuming. This is because the traditional approach to repairing holes in sheetrock walls requires a series of fairly complex steps. Specifically, the traditional approach for repairing drywall damage begins by mixing the repair compound. Next, the user must prepare a hole cover out of a sheet of replacement sheetrock that is cut to a size that exactly matches the hole and/or must cut a porous wall patch or strips of drywall tape to be placed over the hole. The curable repair compound is then applied to the damaged wall area over the new drywall piece, the porous wall patch and/or drywall tape. Once the repair compound is applied, it must be allowed to cure.

Unfortunately, even fast-curing repair compounds take approximately between 60-90 minutes to cure. Other repair compounds may take a day or more to cure. After the compound cures, the repaired area must be sanded flush with the rest of the wall. Following sanding, a texture coat must be applied to the repaired area to match the texture of the surrounding wall area. Finally, once the texture coat has dried, the repaired area is painted to match the color of the surrounding wall area.

Although more recent efforts have seen the introduction of pre-mixed patches which can be adhered over the drywall hole, such items have met with limited commercial success because the lightweight structure of such patches often results in the same becoming indented or damaged with the lightest of contact. Moreover, such systems do not allow a user to repeatedly access the drywall opening, as may be the case in instances where periodic maintenance and/or recurring problems occur. As such, the user must repeat the laborious steps described above each time the need to access the opening are required.

The present invention, directed to a magnetic fastener and wall covering system differs from the conventional art in a number of aspects. The manner by which will become more apparent in the description which follows, particularly when read in conjunction with the accompanying drawings.

SUMMARY OF THE INVENTION

The present invention is directed to a magnetic fastener and wall covering system. One embodiment of the present invention can include at least one wall panel having a front facing surface, a magnetically attractive rear facing surface and a side surface forming any number of different shapes such as oval, round, square or rectangle. The wall cover can include any number of decorative elements such as a picture, or texturing, so as to allow the cover to blend with a surrounding wall.

The present invention can also include a plurality of wall fasteners and wall anchors that can function alone or together to engage a wall. A plurality of magnetic spacers of varying thicknesses can be provided. Each of the spacers can include a central aperture for receiving one of the plurality of wall fasteners, and can function to mate with each other, and the magnetically attractive rear surface of the wall panel to position the same onto a wall.

The present invention can also include one or more wall strips having a magnetic top surface and an adhesive back surface. The magnetic surface of each of the wall strips can function to mate with the magnetically attractive rear surface of the wall panel to position the panel onto a wall.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
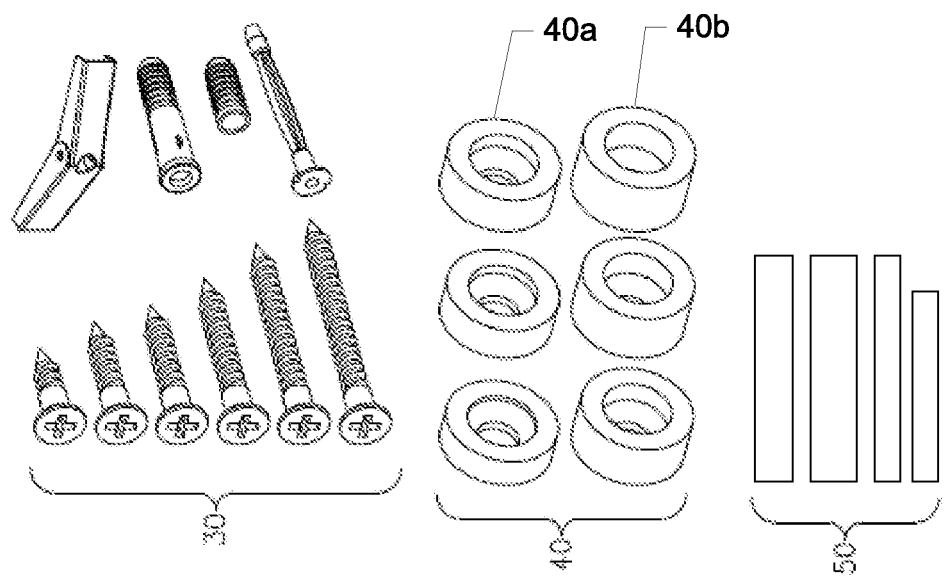
FIG. 1 is an exploded parts view of the magnetic fastener and wall covering system that is useful for understanding the inventive concepts disclosed herein.
Figure 1:
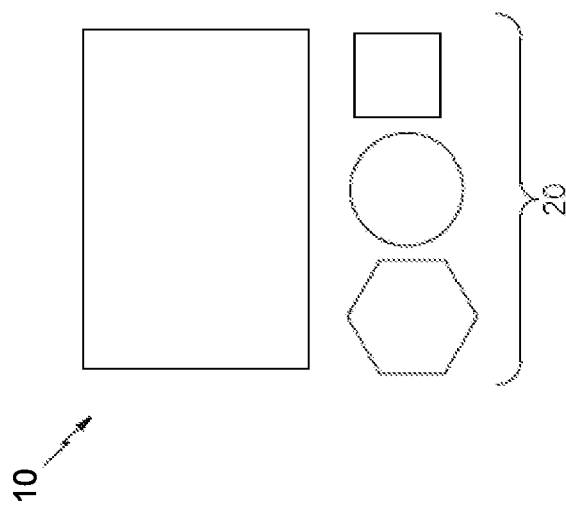

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Although described throughout this document for use with a building wall, the inventive concepts are not limiting to any particular application or material. As such, the system can be utilized equally on any type of surface such as a wall, floor, ceiling or cabinet in any type of structure such as a building, mobile home, or vehicle, for example.

FIGS. 1-8 illustrate various embodiments of a magnetic fastener and wall covering system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 is an exploded parts view of the system components in accordance with one embodiment. As shown, the system 10 can include, essentially, one or more panels 20, having any number of wall fasteners 30, a plurality of magnetic spacers 40 and/or magnetic attachment strips 50. The system can be provided as a kit including the illustrated components.

Figure 2A:
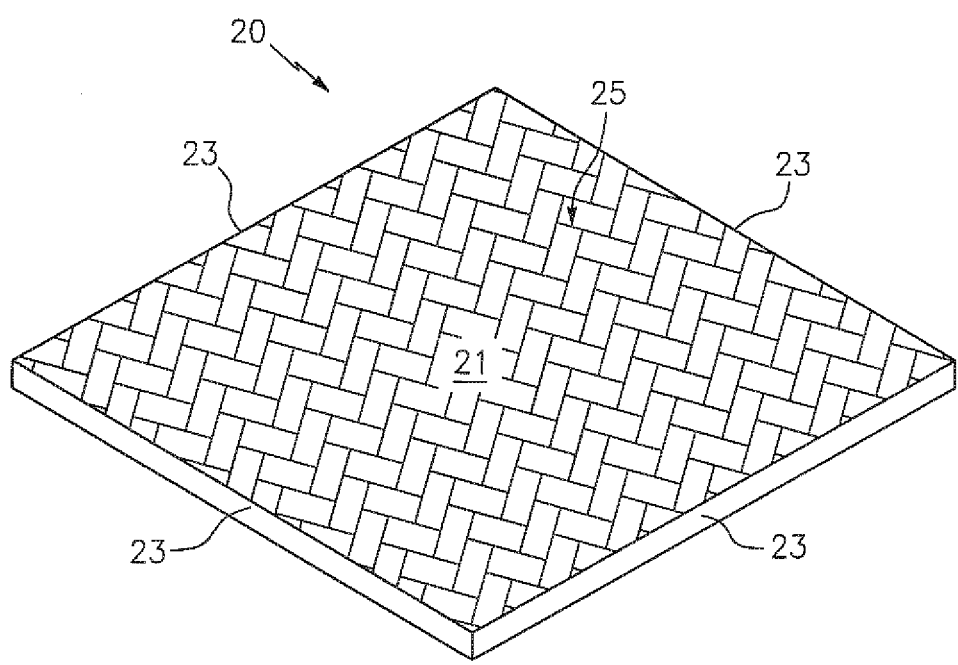
FIG. 2A is a front side view of a wall panel of the system, in accordance with one embodiment of the invention.
Figure 2B:
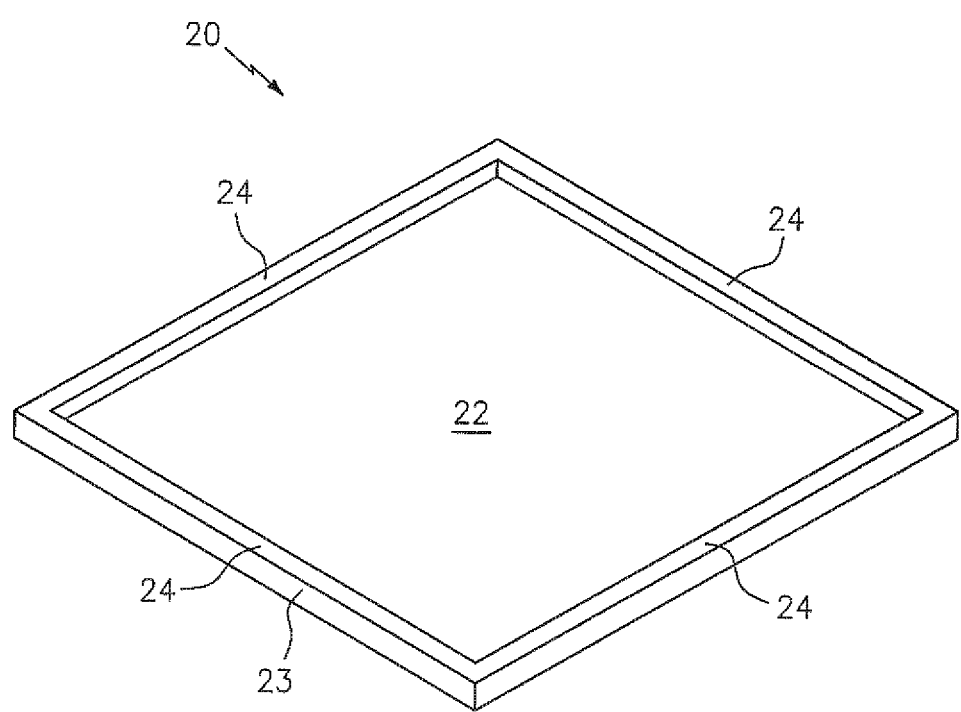
FIG. 2B is a back side view of a wall panel of the system, in accordance with one embodiment of the invention.

As shown in FIGS. 2A and 2B, each of the wall panels 20 can include a main body having a front facing surface 21, a magnetically attractive rear facing surface 22, and a plurality of side surfaces 23. In various embodiments, raised edges 24 can be provided along the outside periphery of the rear facing surface 22 and can provide a separation distance 26 between the rear facing surface 22 and the wall 1 onto which the panel is to be installed (see FIGS. 6B and 7B).

As described herein, the panel can include any number of different sizes and shapes, such as square, rectangular or circle, for example, and can be constructed from any number of different materials such as plastic, metal, wood and/or composites, for example. In various embodiments, the panel can include a two-material construction, wherein the front facing surface 21 is constructed from plastic having a color and texture that matches traditional drywall, and the rear facing surface 22 is constructed from a sheet of thin metal. In such an instance, these materials can be permanently secured together in accordance with any known manufacturing process such as welding, casting or through the use of adhesives, for example.

In addition to the above, the panel 20 can also include any number of decorative elements 25 such as various colors, markings, words, shapes, symbols, logos, designs, lights, types of materials, texturing of materials, patterns, images, and/or photographs, for example. Such decorative elements can be secured onto and/or into the main body in accordance with known techniques so as to be flush with the surface of the main body or can be raised/protruding outward from the main body so as to give a three dimensional effect.

In this regard, the decorative elements can be provided to make the panel stand out from the surrounding wall by providing a picture, for example, or can be provided to make the panel blend in with the surrounding wall by providing a textured surface that matches drywall texture. In such an embodiment, the front facing surface will preferably include a material that is suitable for receiving and retaining paint, so as to allow a user to paint the panel to match the color of the wall.

Figure 3:
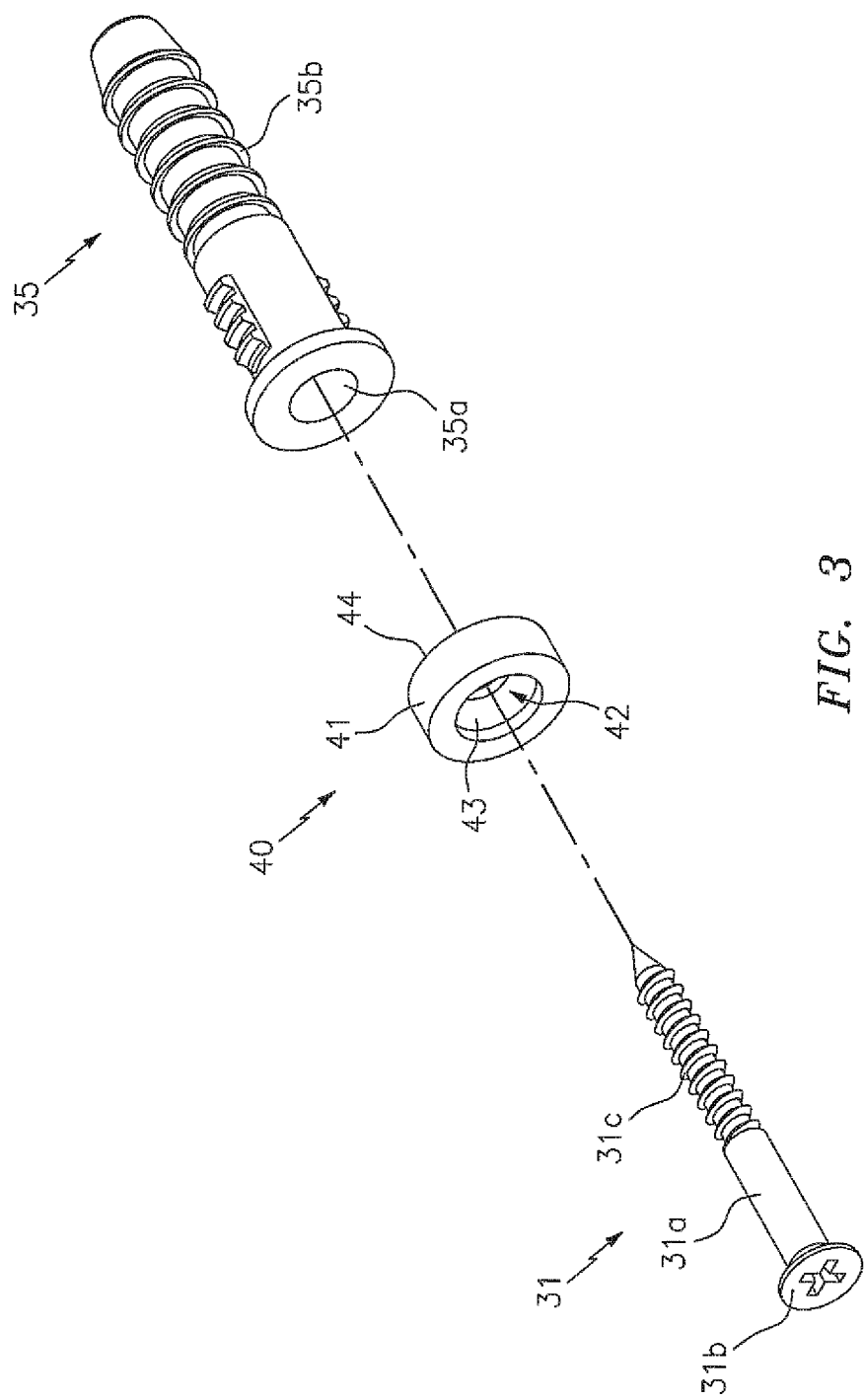
FIG. 3 is a side view of the fastener and magnetic spacer of the system, in accordance with one embodiment of the invention.

The plurality of wall fasteners 30 can include or comprise any number of different elements that are capable of being secured onto or within building materials such as drywall/sheetrock, block and/or wood, for example. As shown in FIG. 3, the fasteners 30 can include any number of elongated screws 31 having a main body 31a, a screw head 31b and a plurality of screw threads 31c along the length of the screw body. The fasteners 30 can also include any number of generally hollow and expandable wall anchors 35 having an opening 35a for receiving the screw 31 and a body 35b which can expand behind the surface of a building wall. Several nonlimiting examples of wall anchors can include, for example, expanding plastic anchors, lag screw shields, expanding, toggle wing, wedge and/or drywall self-drilling anchors, for example. Of course, in various embodiments, the screw threads 31c of the screws 31 can be constructed to grip a particular building material such as wood studs, for example, in order to be secured directly onto a wall without the use of an anchor 35.

The plurality of magnetized spacers 40 can each include a generally circular shaped body 41 having a central aperture 42 a top surface 43 and a bottom surface 44. The spacers can be constructed from any type of metal and can be magnetized in accordance with known processes. The spacers can include any number of different sizes (e.g., diameter of the main body) and/or thicknesses (e.g., distance from the top surface 43 to the bottom surface 44). More specifically, the plurality of magnetized spacers can include at least two different thicknesses 40a and 40b, for example, which can be used alone, together and/or in a stacked orientation to achieve different separation distances.

In either instance, the central aperture 42 of each of the plurality of magnetized spacers can include a dimension that is suitable for receiving the main body 31a and screw threads 31c, but that is less than the dimension of the screw head 31b of the same screw 31.

Figure 4:
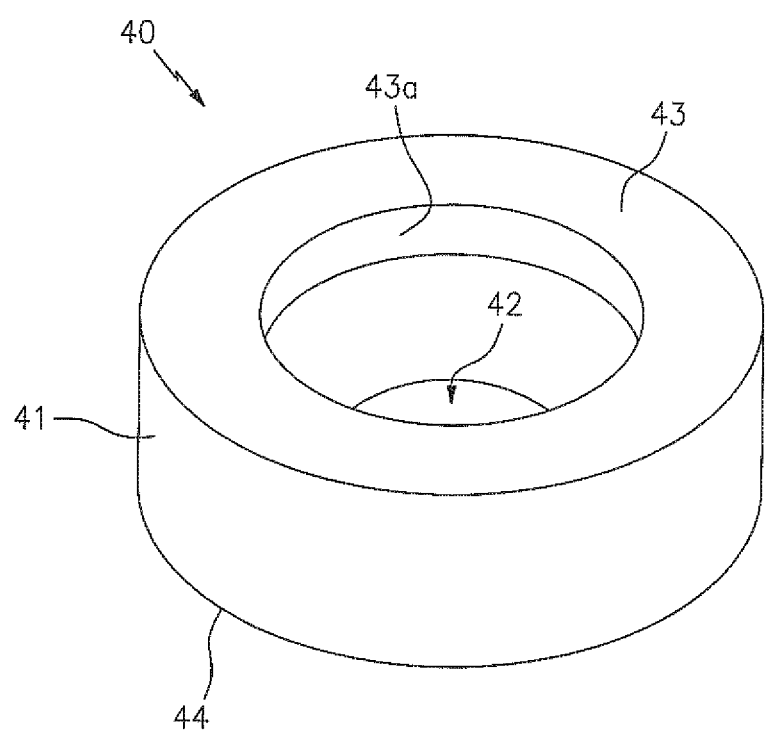
FIG. 4 is a perspective view of the magnetic spacer of the system, in accordance with one embodiment of the invention.
Figure 6A:
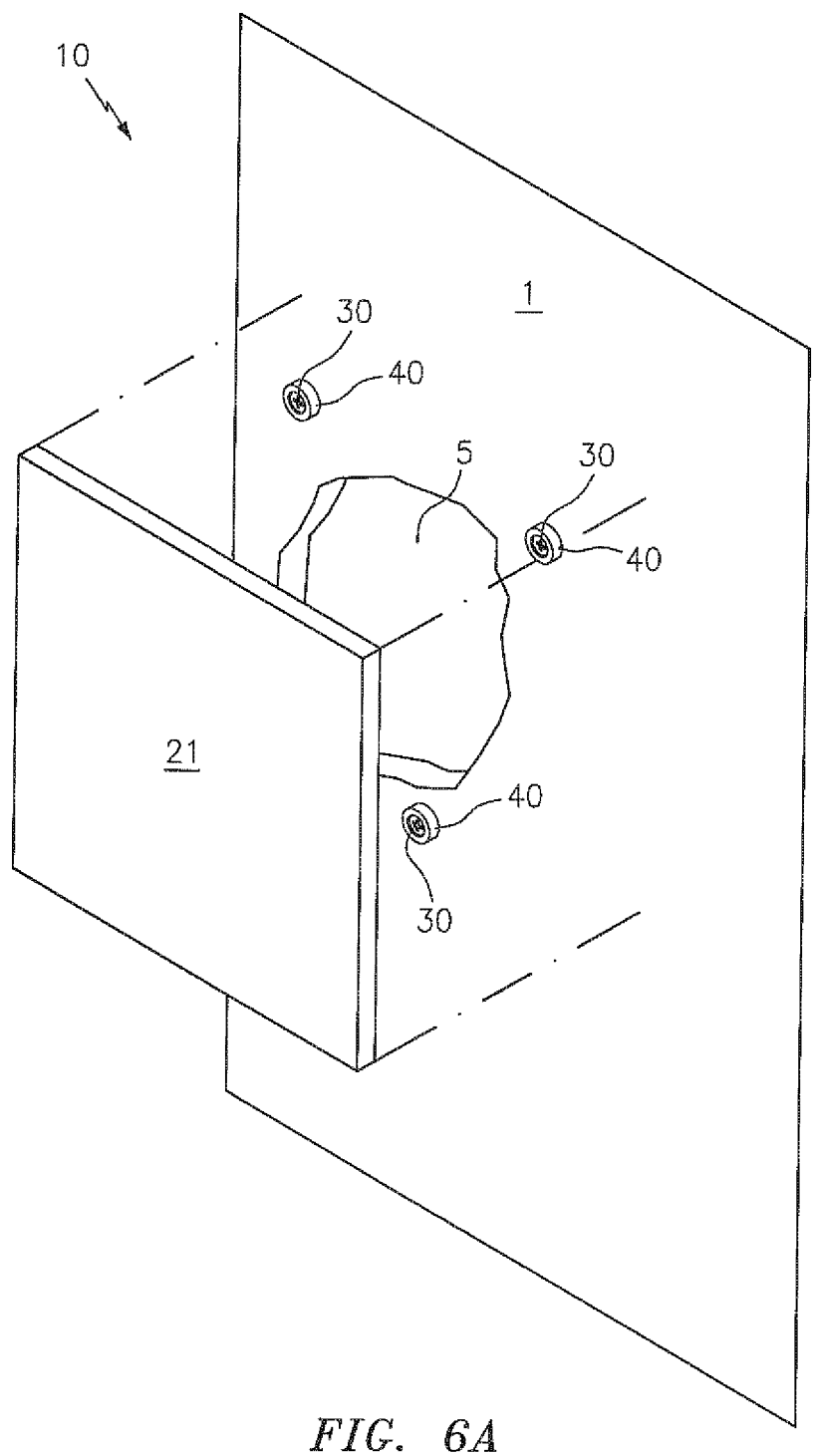
FIG. 6A is a perspective view of the magnetic fastener and wall covering system in operation, in accordance with one embodiment of the invention.
Figure 6B:
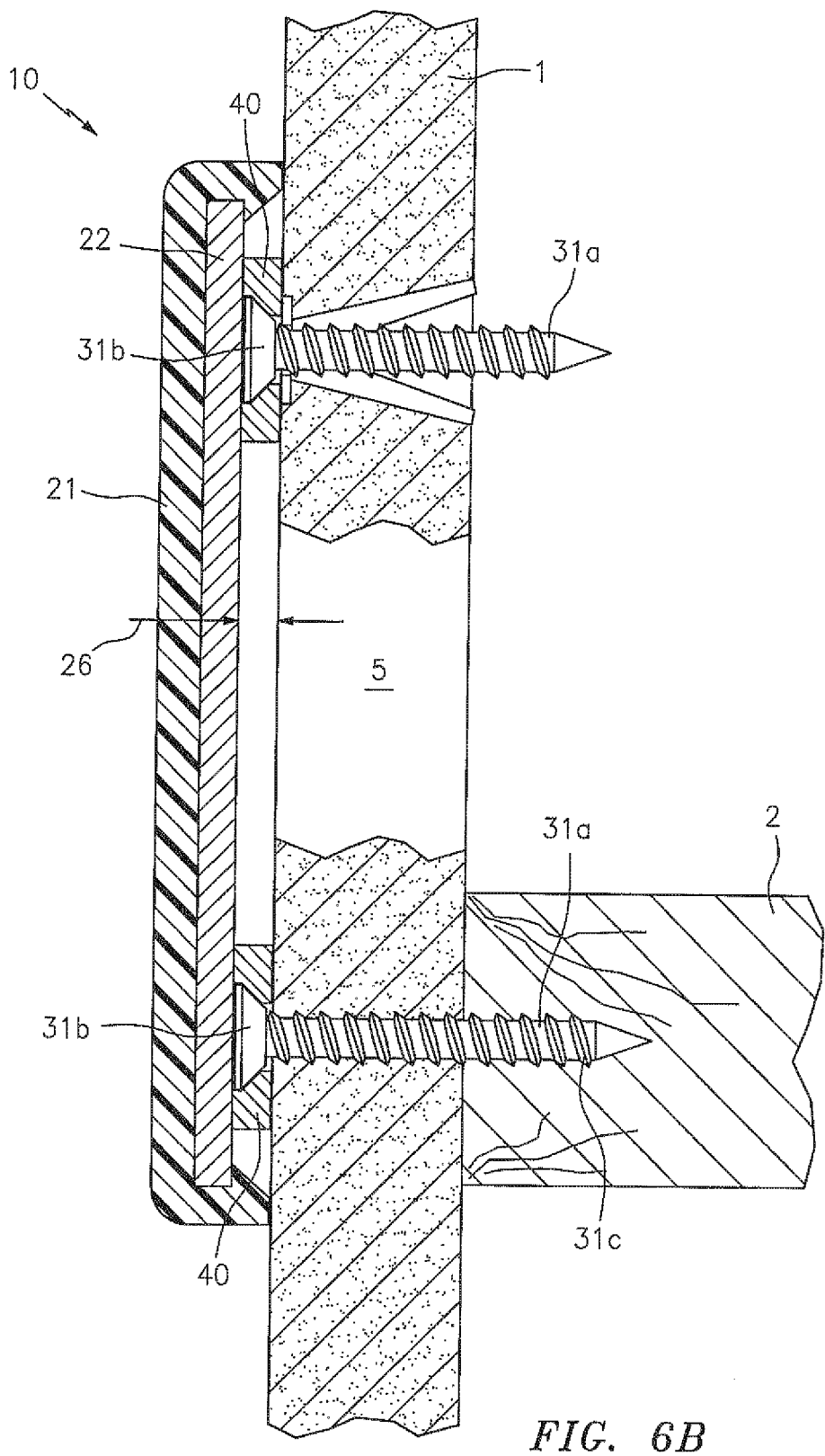
FIG. 6B is a cross sectional view of the magnetic fastener and wall covering system in operation, in accordance with one embodiment of the invention.

As shown in FIG. 4, one embodiment of the spacer 40 can include a raised outer periphery 43a that is greater than the depth/height of the screw head 31b, so as to allow the screw head of any screw positioned within the aperture 42 to be located flush with, or entirely beneath the outer periphery 43a. As shown by FIGS. 6A and 6B, such a feature ensures that no matter how many wall fasteners are being utilized, each one will have a smooth magnetic outer surface providing an identical separation distance 26 between the wall 1 and the magnetically attractive rear facing surface 22 of the wall plate 20.

Figure 5:
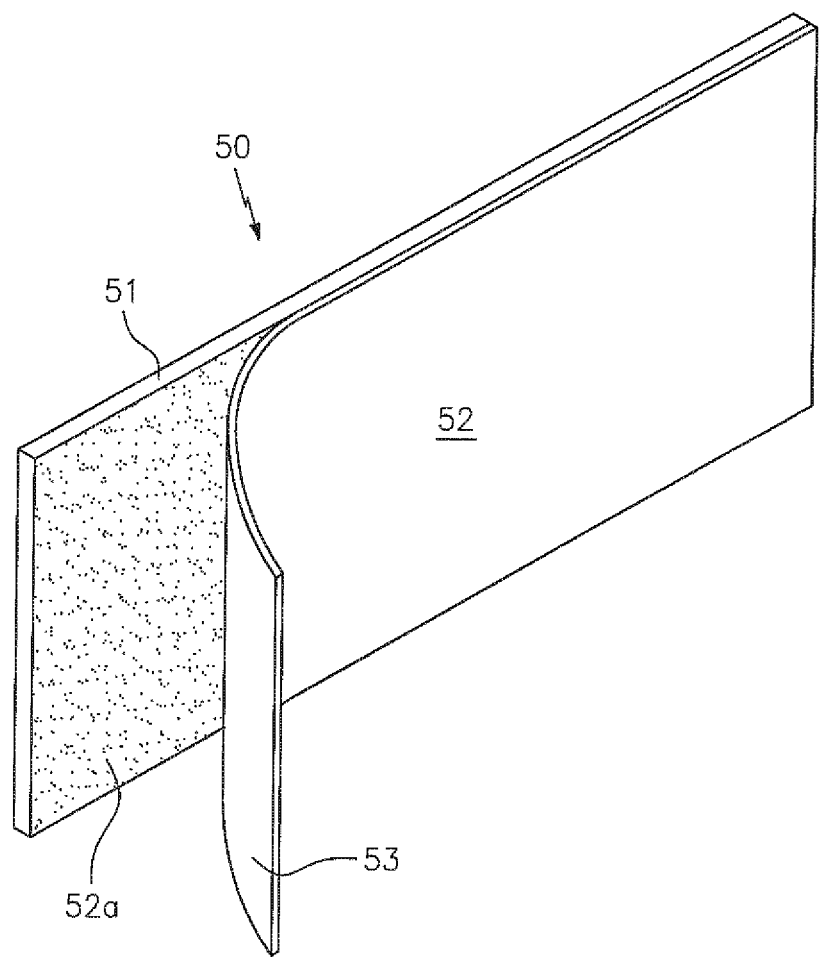
FIG. 5 is a perspective view of the wall strip of the system, in accordance with one embodiment of the invention.

As shown in FIG. 5, the system can also include a plurality of wall strips 50 each having a magnetized top surface 51 and a back surface 52 that is covered with an adhesive 52a such as glue or resin, for example. The strip can be provided with a removable covering layer 53 until ready for use. Each of the strips can be provided in any length, width and/or thickness, and can allow the system to be utilized on walls and other surfaces such as tiles, for example, where it is preferable to utilize a peel-and-stick type of fastener. To this end, the peel and stick fastener(s) can be used in addition to (see FIG. 8), or in lieu of the above described fasteners 30.

FIGS. 6A and 6B illustrate one embodiment of the system 10 in operation to cover an opening 5 in a wall 1. As shown, one or more of the wall fasteners 30 having a magnetic spacer 40 can be screwed into the drywall 1 at locations adjacent to the opening 5. If a stud 2 is present, the screw 31 can be secured directly to the stud, otherwise a wall anchor 35 can be used. Next, the user can select a panel 20 having a shape and size that is suitable for covering the opening 5. Upon selecting the panel, the user can simply place the magnetically attractive rear facing surface 21 next to the magnetic spacers 40, and the magnets will pull the panel against the wall and secure the same thereon.

Figure 6C:
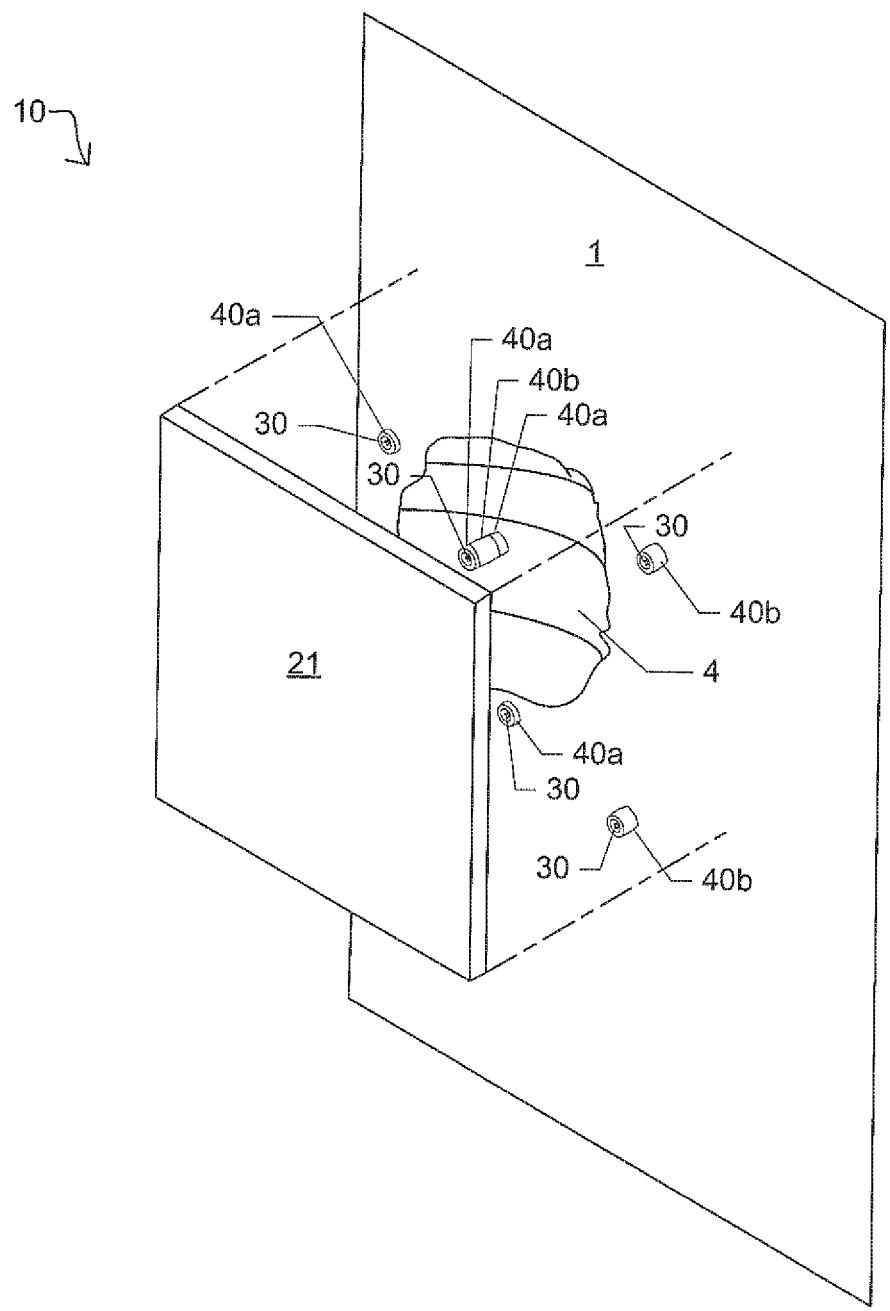
FIG. 6C is a perspective view of the magnetic fastener and wall covering system in operation, in accordance with one embodiment of the invention.

As shown by FIG. 6C, a plurality of different sized spacers 40a and 40b, can be used at the same time to secure the wall plate 20 to the wall 1 at any number of different separation distances, wherein the thicker spacers 40b provide a greater separation distance than the thinner spacers 40a. Moreover, owing to the magnetic qualities of the spacers, any number of individual spacers 40a and/or 40b can be simply aligned and stacked together to form a user-customized separation distance. Such features are particularly advantageous for allowing a user to orient the wall plate at any number of different angles relative to the wall, and/or for allowing the system to be used in conjunction with a damaged and/or uneven section 4 of a wall 1.

Figure 7A:
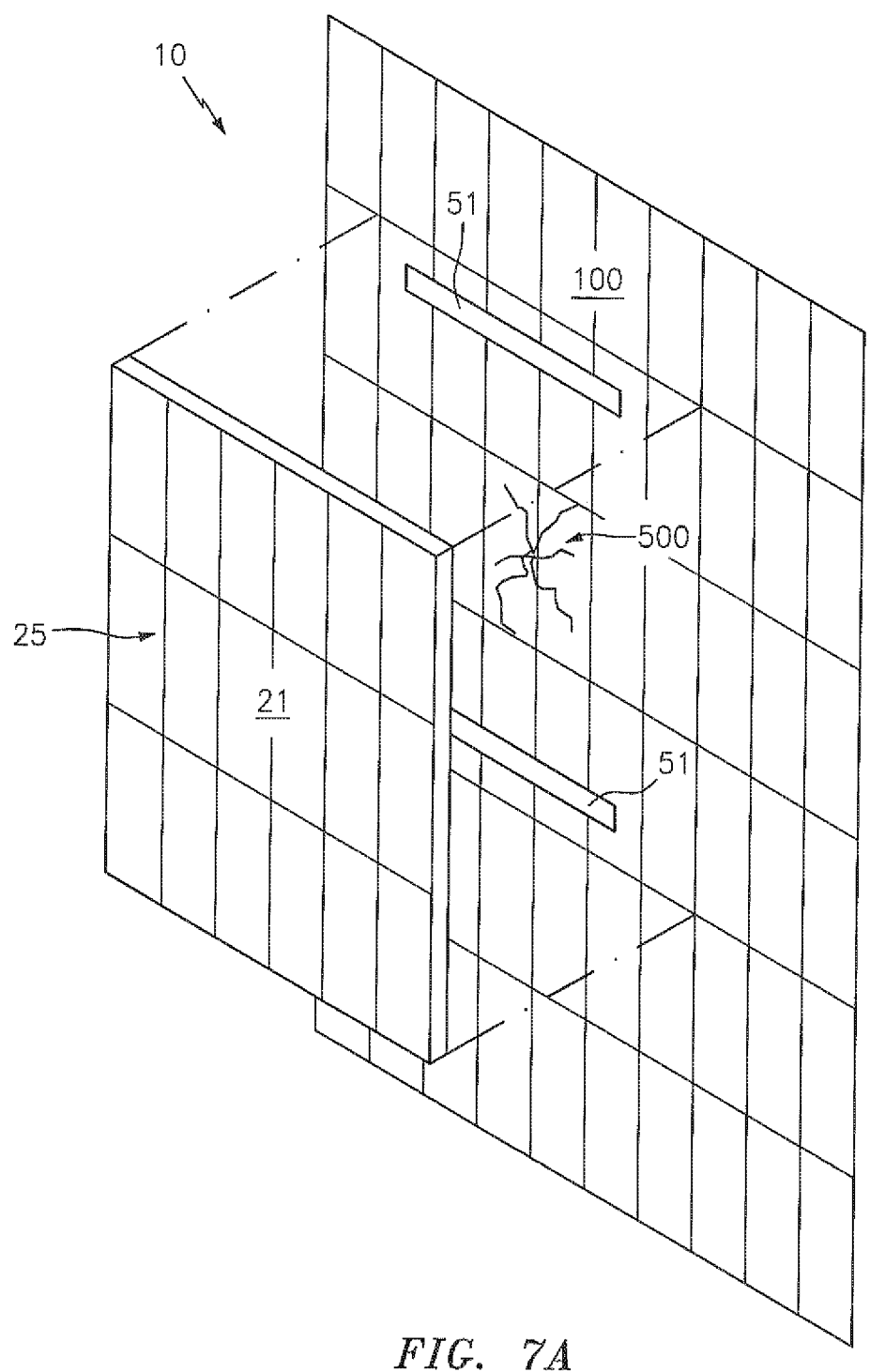
FIG. 7A is another perspective view of the magnetic fastener and wall covering system in operation, in accordance with one embodiment of the invention.
Figure 7B:
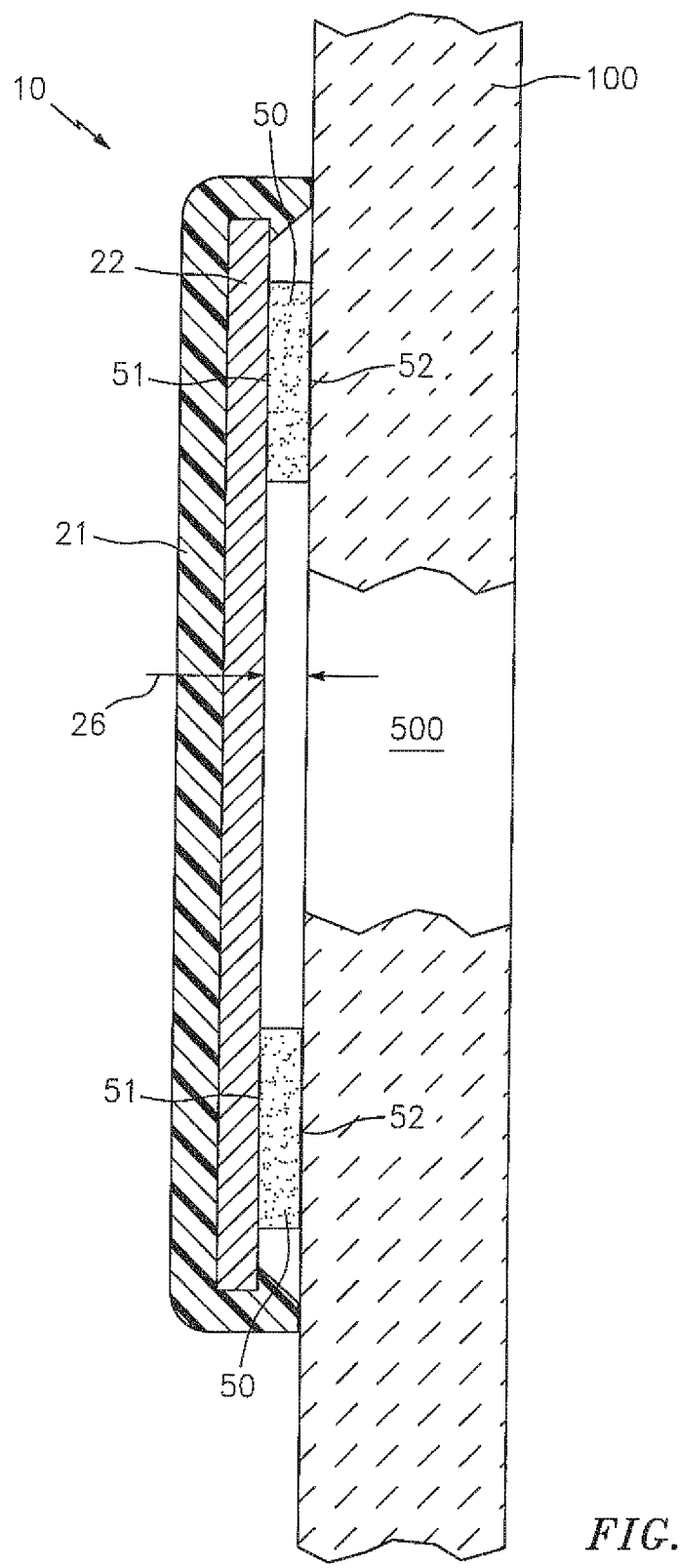
FIG. 7B is another cross sectional view of the magnetic fastener and wall covering system in operation, in accordance with one embodiment of the invention.
Figure 8:
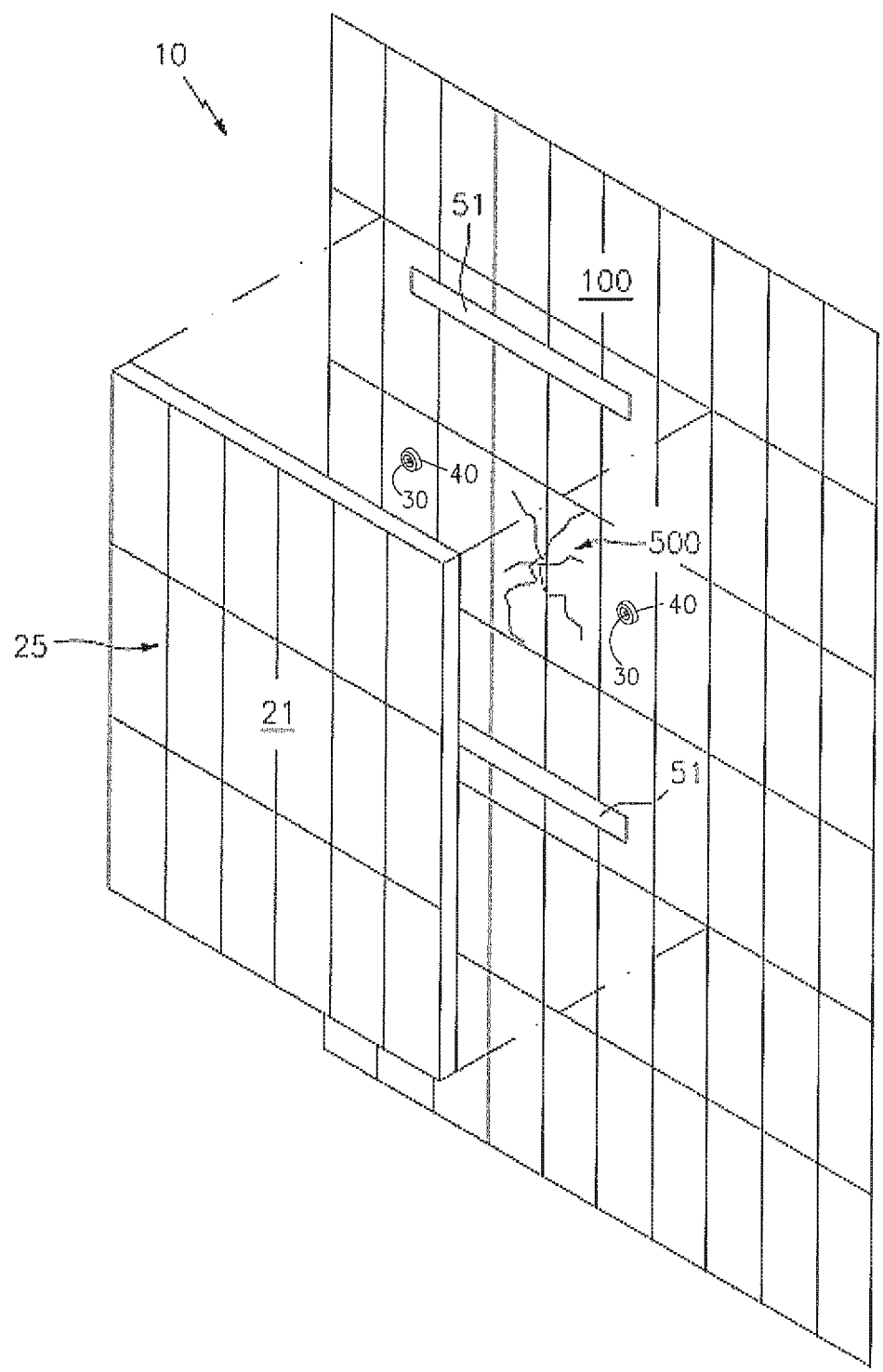
FIG. 8 is another cross sectional view of the magnetic fastener and wall covering system in operation, in accordance with one embodiment of the invention.

Likewise, FIGS. 7A and 7B illustrate one embodiment of the system 10 in operation to cover a cracked portion 500 of a tile wall 100. As shown, one or more of the magnetic strips can be adhered to the tile wall 100 by removing the protective layer and pressing the same onto the wall. Next, the user can select a panel 20 having a shape and size that is suitable for covering the damaged tile members 500. In the present example, the selected panel includes markings 25 in the form of a picture that matches the design of the tile wall 100, so as to allow the panel to blend in with the wall. Upon selecting the panel, the user can simply place the magnetically attractive rear facing surface 21 next to the magnetized top surface 51, and the magnetized surfaces will pull the panel against the wall and secure the same thereon.

As such, the system 10 can be utilized to quickly and easily position any number of wall panels along a wall or other type of structure for any number of different reasons. Moreover, as the fasteners 30 and 50 can each engage the entire rear facing surface of the panel, the system advantageously does not require a user to precisely measure distances on or about the wall, or to ensure that the fasteners are level with each other. Such a feature represents a substantial improvement to the conventional systems and allows users a simple and cost effective means for covering walls without requiring specialized tools or knowledge.

As described herein, one or more elements of the system 10 can be secured together utilizing any number of known attachment means such as, for example, glue, compression fittings and welds, among others. Moreover, although the above embodiments have been described as including separate individual elements, the inventive concepts disclosed herein are not so limiting. To this end, one of skill in the art will recognize that one or more individual elements such as the screw 31 and the spacer 40, for example, may be formed together as one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A wall covering system, comprising:
   at least one unitary wall panel having a front facing surface, a side surface, and a rear facing surface having a magnetically attractive element along an entirety thereof;
   a plurality of wall fasteners that are configured to engage a wall; and
   a plurality of magnetic spacers that each include a body having a central aperture for receiving one of the plurality of wall fasteners, and a top surface that is configured to engage the magnetically attractive element along the entirety of the rear facing surface of the at least one unitary wall panel, said plurality of magnetic spacers including a first plurality of magnetic spacers having a first thickness, and a second plurality of magnetic spacers having a second thickness, wherein the first thickness is less than the second thickness, and the first plurality of magnetic spacers and the second plurality of magnetized spacers are used in combination to provide a variable separation distance between the at least one unitary wall panel and the wall.

2. The system of claim 1, further comprising:

a plurality of raised edges that are disposed along an outside periphery of the rear facing surface of the at least one wall panel, said raised edges functioning to span the separation distance between the rear facing surface and the wall.

3. The system of claim 1, wherein the plurality of wall fasteners include, an elongated screw having a main body, a screw head and a plurality of screw threads.

4. The system of claim 3, further comprising:

a plurality of wall anchors, each of said anchors being configured to receive one of the elongated screws and to expand within a wall.

5. The system of claim 1, wherein the at least one wall panel includes a plurality of wall panels each having a different shape and size.

6. The system of claim 1, further comprising:

a plurality of wall strips, each of said strips including a magnetized top surface, and an adhesive backed bottom surface, wherein the magnetized top surface is configured to engage the magnetically attractive rear facing surface of the at least one wall panel.

7. The system of claim 1, wherein the at least one wall panel includes a shape comprising, at least one of, a circle, a rectangle and a square.

8. The system of claim 1, further comprising:

decorative elements that are disposed along the at least one wall panel.

9. The system of claim 8, wherein the decorative elements include a picture.

10. A wall covering system, comprising:

at least one unitary wall panel having a front facing surface, a side surface, and a rear facing surface having a magnetically attractive element along an entirety thereof;

at least one wall strip that includes a magnetized top surface and an adhesive backed bottom surface, said magnetized top surface being configured to engage the magnetically attractive element along the entirety of the rear facing surface of the at least one unitary wall panel;

a plurality of wall fasteners that are configured to engage a wall; and a plurality of magnetic spacers that each include a body having a central aperture for receiving one of the plurality of wall fasteners, and a top surface that is configured to engage the magnetically attractive element along the entirety of the rear facing surface of the at least one unitary wall panel, said plurality of magnetic spacers including a first plurality of magnetic spacers having a first thickness, and a second plurality of magnetic spacers having a second thickness, wherein the first thickness is less than the second thickness, and the first plurality of magnetic spacers and the second plurality of magnetized spacers are used in combination to provide a variable separation distance between the at least one unitary wall panel and the wall.

* * * * *